United States Patent [19]

Noguchi et al.

[11] Patent Number: 5,469,210
[45] Date of Patent: Nov. 21, 1995

[54] IMAGE PICKUP APPARATUS WITH CONTROL FOR OUTPUT OF NON-VIBRATING IMAGES

[75] Inventors: Kazuhiro Noguchi, Kawasaki; Shigeru Ogino, Tokyo; Takashi Kobayashi, Mitaka, all of Japan

[73] Assignee: Canon Kabushiki Kaisha, Tokyo, Japan

[21] Appl. No.: 105,778

[22] Filed: Aug. 12, 1993

Related U.S. Application Data

[63] Continuation of Ser. No. 843,916, Feb. 27, 1992, abandoned.

[30] Foreign Application Priority Data

Mar. 1, 1991 [JP] Japan ................... 3-035969
Mar. 18, 1991 [JP] Japan ................... 3-052271

[51] Int. Cl.$^6$ ................... H04N 5/232
[52] U.S. Cl. ................... 348/208; 348/231; 358/906
[58] Field of Search ................... 358/222, 105, 358/209, 906; 348/208, 220, 231, 372; 354/430; H04N 5/232

[56] References Cited

U.S. PATENT DOCUMENTS

| | | | |
|---|---|---|---|
| 4,403,250 | 9/1983 | Kellar | 358/105 |
| 4,901,143 | 2/1990 | Uehara et al. | 358/222 X |
| 5,164,824 | 11/1992 | Ieoka et al. | 358/105 X |
| 5,235,427 | 8/1993 | Kim | 358/222 |

FOREIGN PATENT DOCUMENTS

| | | | | |
|---|---|---|---|---|
| 1125068 | 5/1989 | Japan | | H04N 5/232 |
| 1174076 | 7/1989 | Japan | | H04N 5/232 |
| 3117278 | 5/1991 | Japan | | H04N 5/232 |

*Primary Examiner*—Wendy R. Greening
*Attorney, Agent, or Firm*—Robin, Blecker, Daley & Driscoll

[57] ABSTRACT

An image pickup apparatus comprises a memory to store an image signal generated from an image pickup device; a switching circuit to switch an output of the image pickup device and an output of the memory; a vibration sensor to detect the vibration of the apparatus main body; and a control circuit to allow the fetch of the image signal generated from the image pickup device into the memory when the vibration detected by the vibration sensor is equal to or less than a predetermined value.

18 Claims, 8 Drawing Sheets

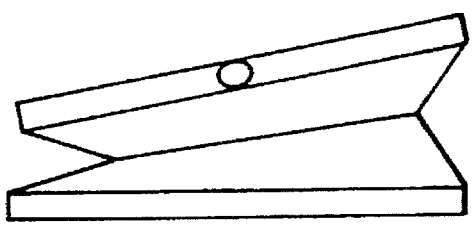
FIG.5A
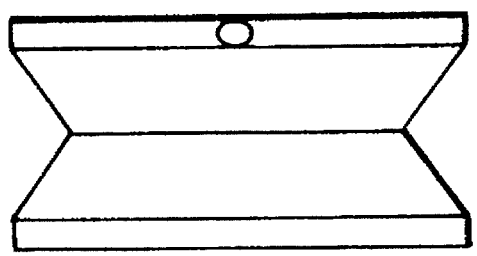
FIG.5B
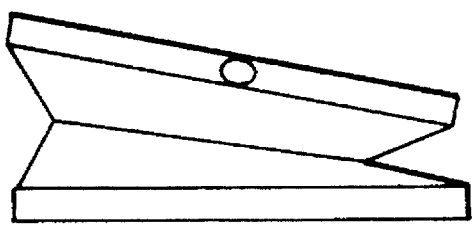
FIG.5C

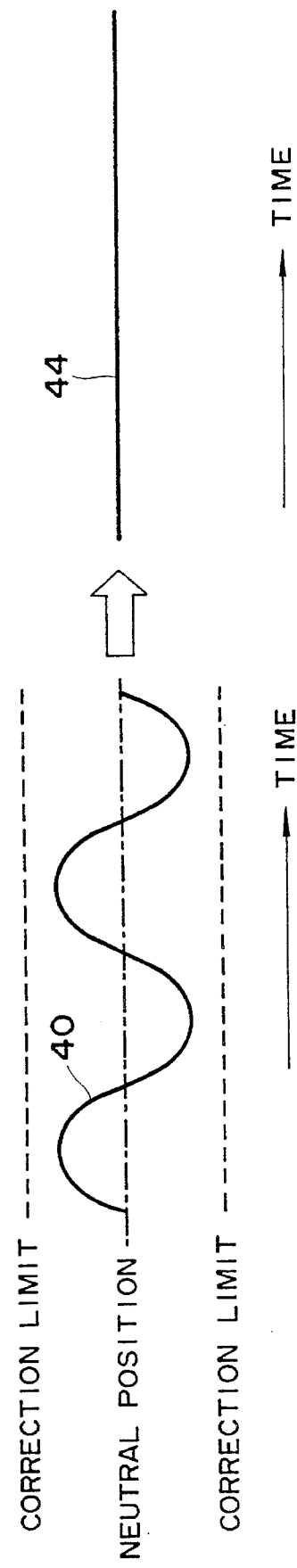

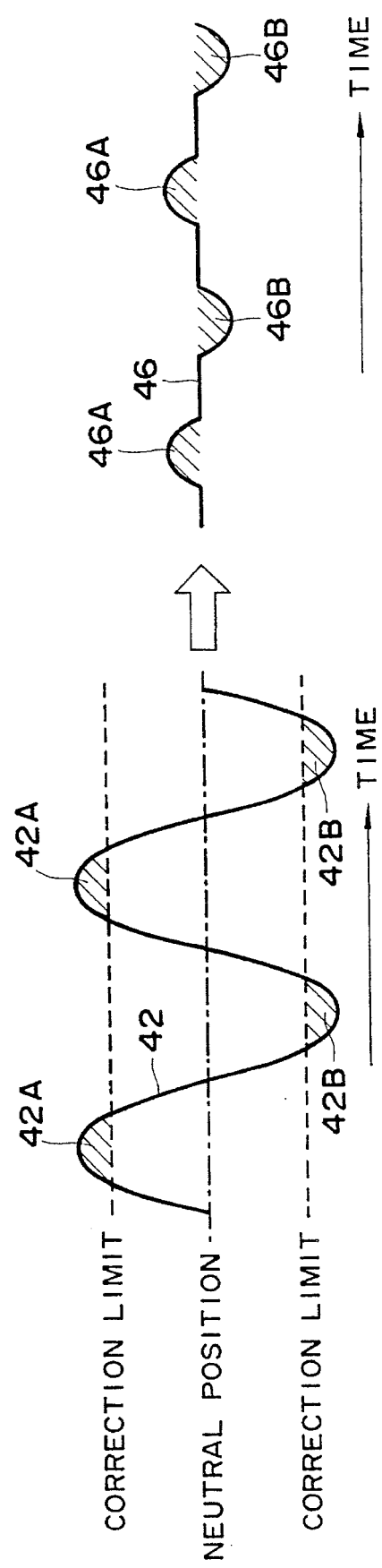

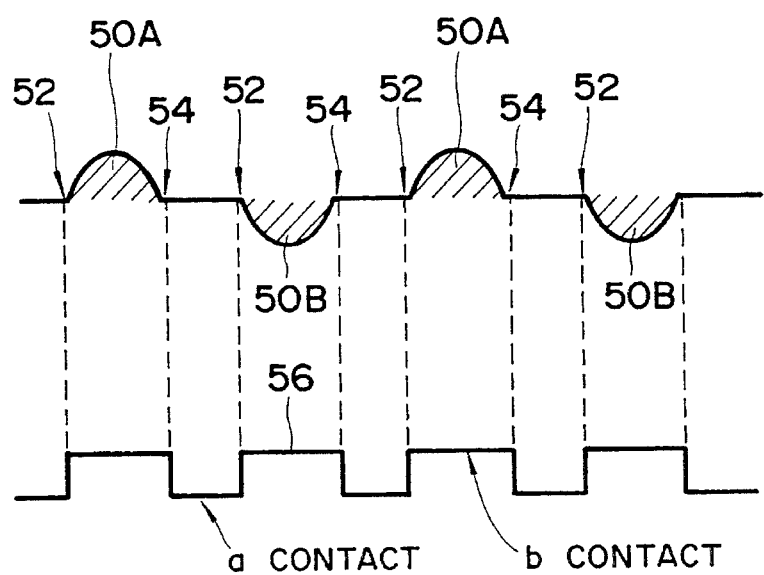
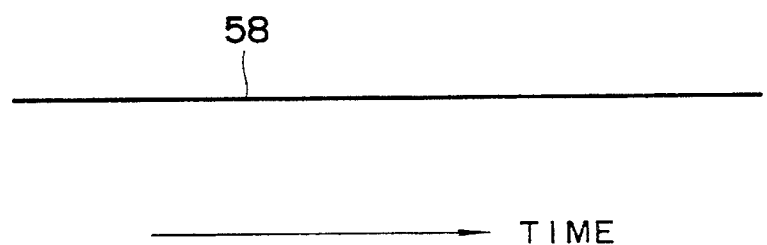

IMAGE PICKUP APPARATUS WITH CONTROL FOR OUTPUT OF NON-VIBRATING IMAGES

This is a continuation of prior application Ser. No. 843,916, filed Feb. 27, 1992 now abandoned.

BACKGROUND OF THE INVENTION

1. Field of the Invention

The invention relates to an image pickup apparatus such as a video camera, video recorder of the camera integrated type, or the like.

2. Related Background Art

In an image pickup apparatus having an image pickup device for converting an object image into an electric signal, for instance, in a video tape recorder of the camera integrated type which has been remarkably developed in recent years, various kinds of functions such as automatic focusing, automatic iris, zoom, and the like are equipped as standard functions. Further, functions to provide special effects such as fetch of a still image by a digital memory, strobe effect, multiplex of characters or image, wipe, scroll, fade, and the like are also equipped. The video tape recorder of the camera integrated type has an extremely high quality with respect to the functions and operating performance.

FIG. 1 shows a schematic constructional block diagram of a conventional example. An image pickup device 10 generates an electric signal of an object image. A camera signal processing circuit 12 converts the output signal of the image pickup device 10 into the video signal. An A/D converter 14 converts the analog video signal which is generated from the camera signal processing circuit 12 into the digital signal. The digital output signal is written into a memory 16 and is subjected to the above special effects. The image data stored in the memory 16 is read out and returned into the analog signal by a D/A converter 18. A control circuit 20 supplies sampling clocks to the A/D converter 14 and D/A converter 18 in accordance with the operation of an operation switch 21 to instruct a special effect and also executes a digital signal process for the special effect using the memory 16. That is, the control circuit 20 allows the video signal which is generated from the camera signal processing circuit 12 to be stored into the memory 16 in accordance with the operation switch 21.

A switch 22 selects either the output of the camera signal processing circuit 12 or the output of the D/A converter 18 in accordance with a control signal from the control circuit 20. That is, either the video signal which is not subjected to the special effect or the video signal which has been subjected to the special effect is selected. The video signal selected by the switch 22 is applied to a recording circuit 24 and a monitor 26. The recording circuit 24 records the video signal onto a recording medium such as a magnetic tape or the like. The monitor 26 displays the image of the video signal.

By continuously connecting the switch 22 to the side of the D/A converter 18 to a certain degree, the display video image of the monitor 26 and the recording video image by the recording circuit 24 are set into a stationary state. The output video signal of the camera signal processing circuit 12 is intermittently stored into the memory 16. By switching the switch 22 to either the output side of the camera signal processing circuit 12 or the output side of the D/A converter 18 in accordance with the data storage, the strobe effect is obtained.

However, the storage of the video signal which is generated from the camera signal processing circuit 12 into the memory 16 is performed by the control circuit 20 in accordance with the operation of the operation switch 21 by the photographer. Consequently, there are drawbacks such that the video signal of the vibrated image is stored into the memory 16 due to a shock, a hand vibration, or the like when the operation switch 21 is operated, so that the picture quality of the still image based on the still function, strobo function, or the like is lost.

On the other hand, generally, when the photographing by the video camera is considered, it must be considered that the camera vibration can obviously occur. The image stored in a state during the occurrence of the camera vibration becomes the image including the vibration even when it is stored as a still image into the memory. Such a drawback becomes a seriously large problem, particularly, in the video camera to continuously photograph moving images for a long time instead of a momentary photographing as in the case of the still camera.

SUMMARY OF THE INVENTION

The invention is made to solve the above problems and it is the first object of the invention to provide a novel video camera in which the storage of an image having a vibration into a memory can be prevented and an always preferable image can be generated.

The second object of the invention is to provide a photographing apparatus in which when an operation to instruct the storage of an image into a memory is performed, the image is stored into the memory at a time point when an influence by a vibration is small, thereby enabling a still image of a high quality without a vibration to be always obtained from the memory.

To accomplish the above objects, according to a preferred embodiment of the invention, there is disclosed an image pickup apparatus comprising an image pickup means; a memory to store an image signal generated from image pickup means; switching means for switching an output of the image pickup means and an output of the memory; vibration detecting means for detecting a vibration of an apparatus main body; and control means for allowing the image signal generated from the image pickup means to be stored into the memory when the vibration detected by the vibration detecting means is equal to or less than a predetermined value.

The third object of the invention is to provide an image pickup apparatus which has a function to correct a camera vibration even when such a vibration of the apparatus occurs and which can generate an image without a vibration even when a vibration such that it exceeds a correction limit and cannot be corrected occurs.

To accomplish the above object, according to a preferred embodiment in the invention, there is disclosed an image pickup apparatus comprising image pickup means for photoelectrically converting an object image and generating an image pickup signal; memory means for storing the image pickup signal generated from the image pickup means; switching means for switching an output of the image pickup means and an output of the memory means; vibration detecting means for detecting a vibration of an apparatus main body; and control means for controlling the switching means on the basis of an output of the vibration detecting means, for generating the image pickup signal generated from the image pickup means when the vibration detected by the vibration detecting means is less than the predetermined value, and for generating the image signal stored in the memory means when the vibration detected by the vibration detecting means is equal to or greater than the predetermined value.

The above and other objects and features of the present invention will become apparent from the following detailed description and the appended claims with reference to the accompanying drawings.

BRIEF DESCRIPTION OF THE DRAWINGS

FIGS. 5A to 5C are side elevational views showing changes in apex angle of a variable apex angle prism 110;

FIGS. 6A and 6B are explanatory diagrams of operation characteristics for a vibration in a vibration correction limit;

FIGS. 7A and 7B are explanatory diagrams of operation characteristics of a conventional example for a vibration exceeding a vibration correction range; and FIGS. 8A to 8C are explanatory diagrams of operation characteristics of the embodiment for a vibration exceeding the vibration correction range.

DETAILED DESCRIPTION OF THE PREFERRED EMBODIMENTS

Embodiments of the invention will be described hereinbelow with reference to the drawings.

Figure 1:
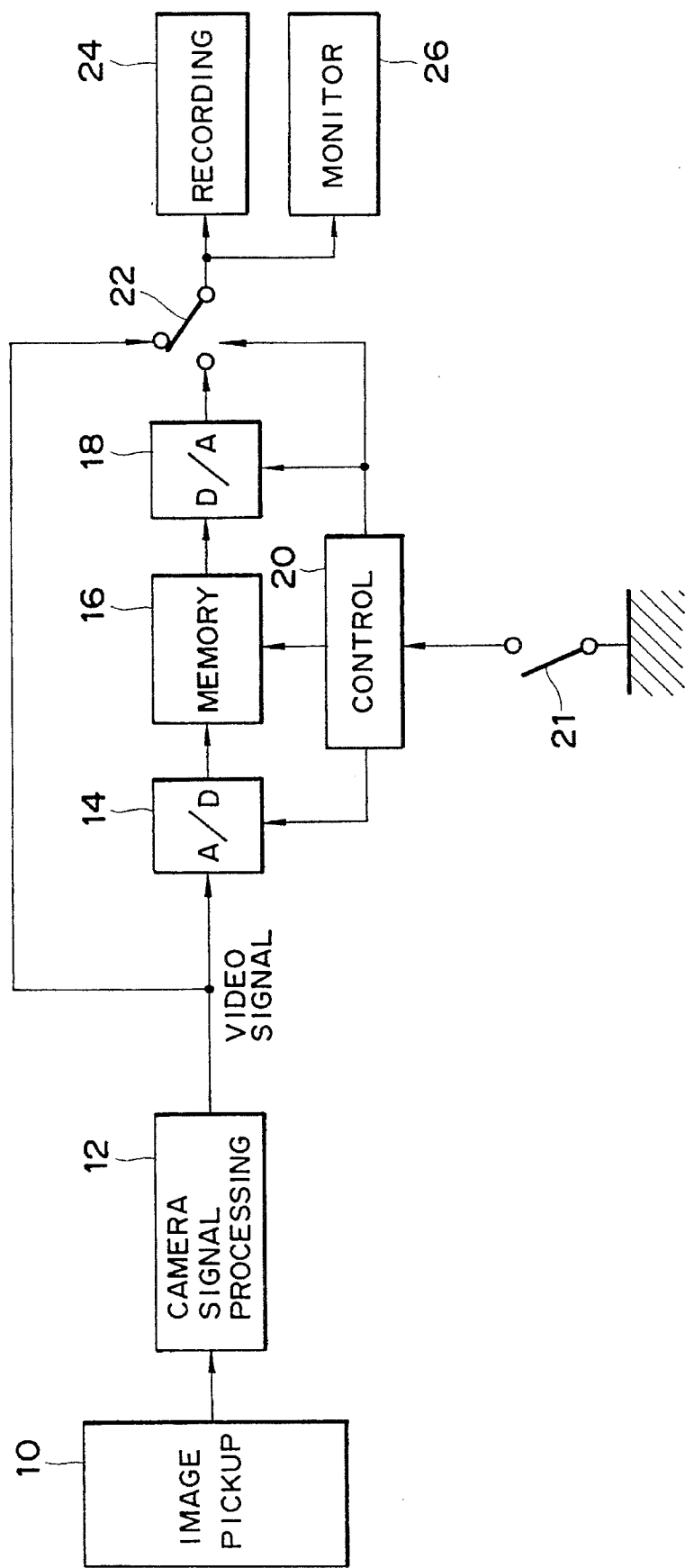
FIG. 1 is a block diagram showing a construction of a video camera having a general image memory.
Figure 2:
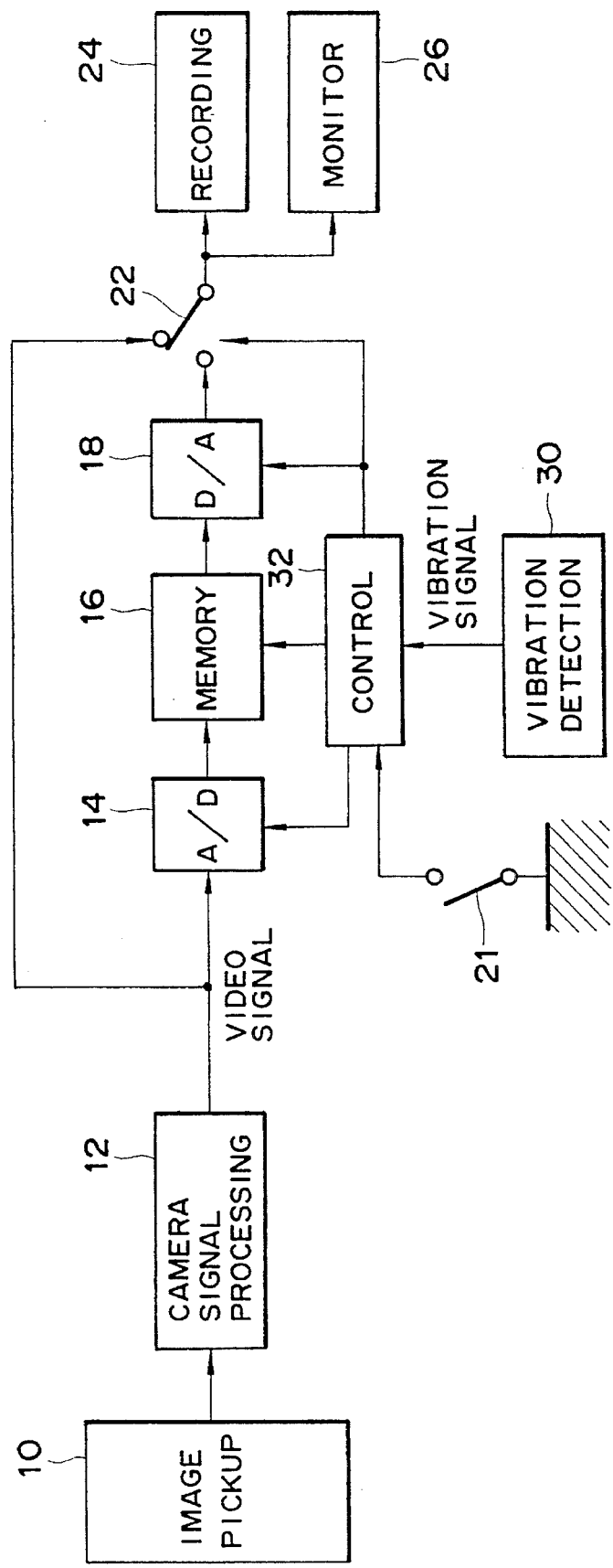
FIG. 2 is a constructional block diagram of an embodiment of the invention.

FIG. 2 shows a schematic constructional block diagram of the first embodiment of the invention. In FIG. 2, the same component elements as those shown in FIG. 1 are designated by the same reference numerals. Reference numeral 30 denotes a vibration detecting circuit to detect the vibration of a camera and 32 indicates a control circuit to control the writing and reading operations of the memory 16 and the switching operation of the switch 22 in accordance with the switching state of the operation switch 21 and an output of the vibration detecting circuit 30, namely, a magnitude of vibration amount. The vibration detecting circuit 30 generates a vector signal A indicative of an amount and a direction of the vibration to the control circuit 32.

Figure 3:
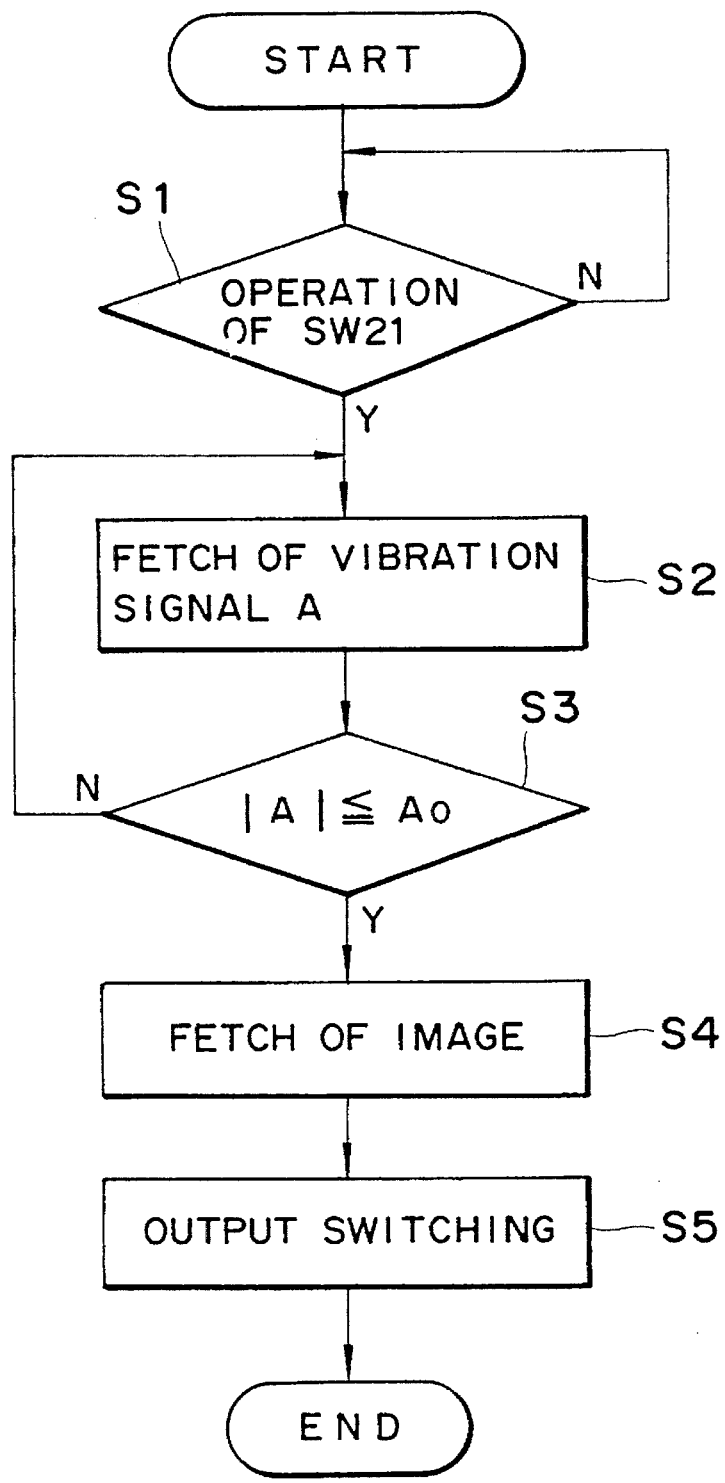
FIG. 3 is an operation flowchart of the embodiment.

The operation of the control circuit 32 will now be described in detail hereinbelow with reference to FIG. 3. First, when the operation switch 21 is operated (step S1), the vibration signal A which is generated from the vibration detecting circuit 30 is fetched (S2). A magnitude |A| of the fetched vibration signal A is compared with a predetermined value $A_0$ (S3). When the magnitude |A| of the vibration signal A exceeds the predetermined value $A_0$ (NO in step S3), the fetch of the output of the vibration detecting circuit 30 is continued until the value of |A| is equal to or less than the predetermined value $A_0$ (S2, S3).

The predetermined value $A_0$ corresponds to the maximum vibration amount at which it is possible to regard that a vibration doesn't substantially occur in the image. When there is a vibration exceeding the vibration amount $A_0$, the vibration is conspicuous in the image, so that the image is hard to see.

When the magnitude |A| of the vibration signal A is equal to or less than the predetermined value $A_0$ (YES in step S3), the A/D converter 14 and memory 16 are made operative and the output video signal of the camera signal processing circuit 12 is fetched into the memory 16 (S4). The switch 22 is switched to the side of the D/A converter 18. The video signal stored in the memory 16 is repetitively read out and is supplied to the recording circuit 24 and monitor 26 through the D/A converter 18 and switch 22. Thus, the image in the still state is displayed on the monitor 26 and recorded onto the recording medium by the recording circuit 24.

By intermittently executing the special effect described here, a strobe effect is derived.

As a vibration detecting circuit 30, it is also possible to use a circuit comprising a sensor to detect an angular acceleration, an angular velocity, an angular displacement, or the like and a processing circuit for processing an output of the sensor and for generating a vector signal or a circuit for digital signal processing an output signal of the image pickup device 10 or camera signal processing circuit 12 and for obtaining an image motion vector.

As will be easily understood from the above description, according to the invention, even when a vibration occurs in the apparatus due to the operation to instruct the fetch of the image signal into the memory means, the data is fetched into the memory means when an adverse influence by the vibration is small. Therefore, the still image of a high quality without a vibration is derived from the memory means. Further, image data without a vibration can be fetched into the memory for a special effect.

The second embodiment of the invention will now be described.

According to the above first embodiment, when the image signal is written into the memory, a state in which the vibration is equal to or less than a predetermined value is detected and the image signal is fetched into the memory so that the image without a vibration can be certainly stored. However, the following second embodiment further discloses an image pickup apparatus which can generate an image without a vibration even for the occurrence of the uncorrectable image vibration by using the memory.

That is, as mentioned above, the size and weight of the video camera are reduced since the solid state image pickup device has been put into practical use. Interest in video cameras has increased because of the realization of its high magnification abilities and multi-functions. In recent years, the exposure control and focus control have been automated and a failure in photographing which is caused due to those controls has decreased. However, the video camera is ordinarily used at a hand gripped position, so that a possibility of hand vibration rises in association with the realization of the light weight and miniaturization. In the case of gripping the video camera by the hand, the screen is almost certainly vibrated. A deterioration of picture quality due to such a vibration of the screen and an unpleasant situation for the viewer watching the video which may result in queaziness or the like become problems.

As means for suppressing or eliminating such a screen vibration, a construction using a gyro mechanism or a construction using an optical decentering apparatus such as a variable apex angle prism or the like is known. According to the former construction, the lens barrel system is stabilized by the gyro mechanism irrespective of the vibration of the photographing apparatus main body. According to the latter construction, the optical axis of the photographing optical system is decentered by the variable apex angle prism in such a direction as to set off the vibration of the photographing apparatus main body. The variable apex angle prism is constructed in a manner such that, for instance, the peripheries of two transparent plates which are away from each other in the direction of the optical axis are closed by bellows and a liquid of a predetermined refractive index is filled in the prism. The photographing optical axis is decentered by inclining the transparent plate on the object side for the surface which crosses perpendicularly to the central axial line (optical axis at the neutral position).

The conventional example using the gyro mechanism has drawbacks of an increase in size of the camera main body and an increase in weight. On the other hand, the conventional example using the variable apex angle prism has advantages such that an increase in size and weight of the camera main body can be minimized because there is no need to construct the lens barrel itself so as to have a movable structure.

However, in the vibration correcting apparatus using the optical axis decentering means such as a variable apex angle prism, when a vibration amount of the camera is large, there is a case where the vibration amount exceeds the correction limit. For instance, the case where the camera main body is vibrated at a proper period will now be considered. FIGS. 6A and 6B show the case where the camera main body is vibrated in a predetermined direction within the vibration correction limit. FIGS. 7A and 7B show the case where the camera main body is vibrated by amounts exceeding the vibration correction limit. In FIGS. 6A and 7A, a broken line indicates the vibration correction limit by the variable apex angle prism and an alternate long and short dash line indicates the neutral position of the variable apex angle prism. In FIGS. 6A and 7A, reference numerals 40 and 42 denote vibrations of the camera main body. FIGS. 6B and 7B show vibrations of the photographed images in the case where the vibration corrections were performed for the vibrations 40 and 42.

When the vibration of the camera main body lies within the vibration correction limit, the photographed image doesn't vibrate but becomes stable in the screen as shown by reference numeral 44 in FIG. 6B. On the other hand, when the vibration of the camera main body exceeds the vibration correction limit, the photographed image doesn't vibrate as shown by reference numeral 46 in FIG. 7B for the vibration in the vibration correction limit as shown by reference numeral 46 in FIG. 7B. However, with respect to the portions (hatched portions 42A and 42B in FIG. 7A) exceeding the vibration correction limit, the vibrations corresponding to the vibration amounts exceeding the vibration correction limit appear on the photographed screen as shown by reference numerals 46A and 46B in FIG. 7B.

That is, although the photographed image is stationary for the camera vibration within the vibration correction range, when there occurs a camera vibration exceeding the correction limit, the photographed image is suddenly largely moved in the vibrating direction, so that an extremely unpleasant image change without a good quality picture occurs.

The embodiment intends to provide a photographing apparatus which can solve such an inconvenience and discloses a video camera comprising image pickup means for photoelectrically converting an object image and generating an image pickup signal; memory means for storing the image pickup signal generated from the image pickup means; switching means for switching an output of the image pickup means and an output of the memory means; vibration detecting means for detecting a vibration of the apparatus main body; vibration correcting means for correcting the vibration on the basis of an output of the vibration detecting means; control means for controlling the switching means on the basis of the output of the vibration detecting means, for selecting the image pickup signal generated from the image pickup means when the vibration detected by the vibration detecting means lies within a range in which the vibration can be corrected by the vibration correcting means, and for generating the image signal stored in the memory means when the vibration detected by the vibration detecting means exceeds a limit at which the vibration can be corrected by the vibration correcting means; and recording means for recording an output of the switching means, wherein for the vibration exceeding the vibration correction limit by optical axis decentering means, the just preceding image signal in the vibration correcting state which is stored into the image memory means is selected, and a stable image without a vibration can be obtained even when a vibration exceeding the vibration correction limit occurs.

Figure 4:
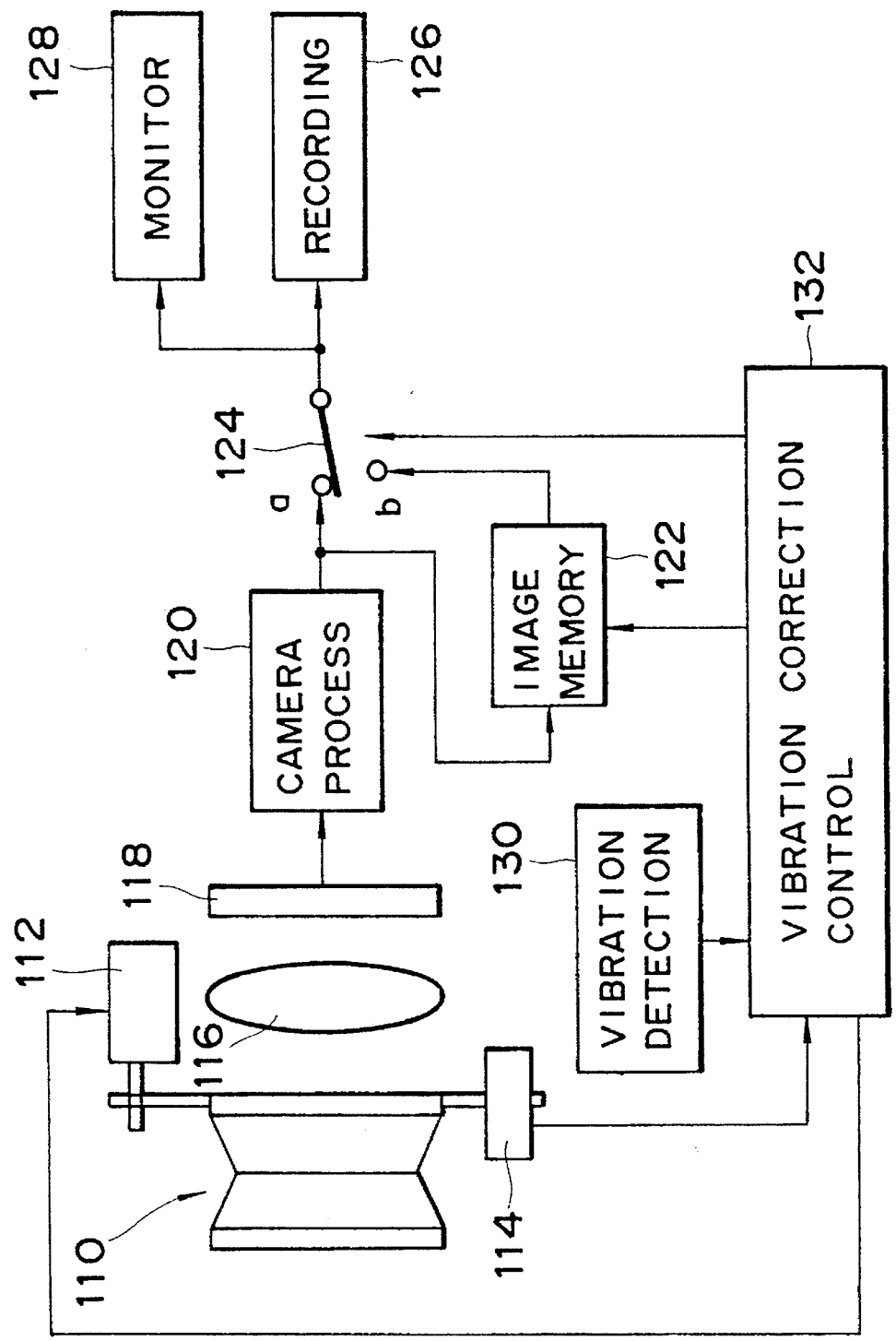
FIG. 4 is a schematic constructional block diagram of the second embodiment of the invention.

FIG. 4 is a block diagram showing a construction of the video camera according to the embodiment. In the diagram, reference numeral 110 denotes a variable apex angle prism (VAP); 112 an actuator (e.g., coil which generates an electromagnetic driving force) to change an apex angle of the prism 110; 114 an angle sensor to detect the apex angle of the prism 110; 116 a photographing optical system; 118 an image pickup device to convert an optical image obtained through the prism 110 and optical system 116 into an electric signal; 120 a camera processing circuit for performing a well-known camera signal process such as gamma conversion or the like to the image signal which is generated from the image pickup device 118 and for generating a video signal of the standard format; and 122 an image memory which has a memory capacity of one picture plane (one field or one frame) and stores the output video signal of the camera processing circuit 120.

Reference numeral 124 denotes a switch to select either the output of the camera processing circuit 120 or the output of the image memory 122. The switch 124 is ordinarily connected to the output side (a contact) of the camera processing circuit 120. Reference numeral 126 denotes a recording circuit to record the video signal selected by the switch 124 to a recording medium such as magnetic tape, magnetic disk, or the like, and 128 indicates a monitor to display a video image of the video signal selected by the switch 124. An electronic view finder of the video camera can be also used in place of the monitor 128.

Reference numeral 130 denotes a vibration detecting sensor which is fixed to the lens barrel of the photographing optical system and detects a vibration of the camera and 132 indicates a vibration correction control circuit to control the whole vibration correction of the embodiment.

FIGS. 5A to 5C are side elevational views of the variable apex angle prism 110. FIG. 5B shows a neutral state in which the apex angle is equal to 0. FIGS. 5A and 5C show vibration correction limits. When the apex angle increases to about an angle as shown in FIG. 5A or 5C, the apex angle cannot be increased beyond the above angles (that is, the optical axis eccentric amount cannot be increased) and reaches the vibration correction limit.

The operation when the vibration correction is not performed is as follows. The optical image which is derived through the prism 110 and photographing optical system 116 enters the image pickup device 118. The image pickup device 118 photoelectrically converts the optical image into the image signal and generates the image signal. The camera processing circuit 120 executes a well-known camera signal process to the image signal and generates the video signal of a predetermined format. The output video signal is supplied to the a contact of the switch 124 and to the image memory 122. The image memory 122 sequentially updates the stored image. The switch 124 is generally connected to the a contact side and the output video signal of the camera processing circuit 120 is supplied to the recording circuit 126 and monitor 128 through the switch 124. The recording circuit 126 records the input video signal onto a magnetic tape or the like in accordance with an instruction of the photographer. The monitor 128 displays the video image of the input video signal.

When the vibration correction is made operative, the following operation is executed. That is, the vibration detecting sensor 130 generates signals indicative of the amount and direction of the camera vibration and sends to the vibration correction control circuit 132. The angle sensor 114 generates a signal indicative of the apex angle of the prism 110 and sends to the vibration correction control circuit 132. The angle sensor 114, vibration correction control circuit 132, and actuator 112 form a closed loop to control the apex angle of the prism 110. For the camera vibration within the vibration correction limit range, the control circuit 132 calculates the eccentric amount and direction of the photographing optical axis such as to set off the camera vibration and controls the actuator 112 so as to change the apex angle of the prism 110 so as to provide such an eccentric state. As shown in FIG. 6B, a stable photographed image which is not influenced by the camera vibration can be obtained.

For the camera vibration exceeding the vibration correction limit, the following operation is executed. As for the vibration exceeding the vibration correction limit of the prism 110, the photographed image oscillates according to the camera vibration as shown by hatched portions 50A and 50B in FIG. 8A. The control circuit 132 switches the switch 124 to a b contact at a timing (shown by reference numeral 52 in FIG. 8A) exceeding the vibration correction limit and inhibits the writing operation (updating) of the image memory 122 and starts the reading operation from the image memory 122. The apex angle of the prism 110 is held unchanged. FIG. 8B shows a control timing signal 56 for the switch 124 and image memory 122. Thus, the video signal of the image which is stored into the image memory 122 is transmitted to the recording circuit 126 and monitor circuit 128 through the switch 124, so that a still image without the camera vibration is visually obtained as shown in FIG. 8C.

The switching operation of the switch 124 and the control of the image memory 122 are obviously performed synchronously with the synchronous timing of the video signal which is generated from the camera processing circuit 120. Actually, they are executed at proper timings before the camera vibration exceeds the vibration correction limit.

When the camera vibration is returned into the vibration correction limit range from a state in which it exceeds the vibration correction limit, the switch 124 is switched to the a contact side at a proper timing (54 in FIG. 8A) within a vibration correction limit range and the vibration correction by the prism 110 is restarted. The writing operation (updating) of the image memory 122 is permitted. At this stage, the photographed image becomes stable by the vibration correction by the prism 110 irrespective of the camera vibration.

By the above control, as shown by a straight line 58 in FIG. 8C, the photographed image is also stabilized even in the camera vibrating portion exceeding the vibration correction limit and the photographed image which is always stable as a whole can be derived. For a period of time during which the camera vibration exceeds the vibration correction limit, the video signal of the same image is supplied to both of the recording circuit 126 and the monitor 128. However, such a period of time is generally an extremely short time like an instantaneous time and it is considered that such a period of time is not conscious in many cases, so that no problem occurs. A visual influence is smaller as compared with that in the cases of the sudden movements as shown by the hatched portions 46A and 46B in FIG. 7B.

In the embodiment, the image signal after it was processed by the camera processing circuit 120 is stored into the image memory 122 and the image signal stored in the image memory 122 is selected for the vibration exceeding a predetermined vibration. The invention, however, is not limited to the above case but a similar effect can be also obtained by providing circuits similar to the image memory 122 and switch 124 at the output stage of the image pickup device 118 or for the signal in the camera processing circuit 120 or the like.

As will be easily understood from the above description, according to the invention, even when there is a vibration exceeding the limit of the vibration correcting capability, the photographed image in which a sense of disorder is visually small is obtained.

What is claimed is:

1. An image pickup apparatus comprising:
   (A) image pickup means for photoelectrically converting an object image and generating an image pickup signal;
   (B) memory means for storing the image pickup signal generated from the image pickup means;
   (C) vibration detecting means for detecting a degree of a vibration of the image pickup apparatus; and
   (D) control means responsive to detection of vibration degree by said vibration detecting means for controlling said memory means so as to perform at least a storing operation of said memory means only during the detection of vibration of less than a predetermined value.

2. An apparatus according to claim 1, wherein said vibration detecting means generates a vector signal indicative of a vibration amount and a vibrating direction.

3. An apparatus according to claim 2, wherein said vibration detecting means is an external sensor unit to detect at least one of angular acceleration, angular velocity and angular displacement.

4. An apparatus according to claim 2, wherein said vibration detecting means is a motion detecting circuit for digital signal processing the image pickup signal and detecting a change in the object image in order to detect the vibration.

5. An image processing apparatus comprising:
   (A) image output means for receiving image information and generating an image signal;
   (B) memory means for storing the image signal generated from the image output means;
   (C) detecting means for detecting a vibration component in the image signal which is generated from the image output means; and
   (D) control means responsive to detection of vibration by said detecting means for controlling said memory means so that a storing operation of the image signal is inhibited until the vibration component detected by the detecting means becomes less than a predetermined value.

6. An apparatus according to claim 5, wherein said image output means is an image pickup device.

7. An apparatus according to claim 5, further having switching means for switching the image signal which is generated from the image output means and the image signal which is generated from the memory means.

8. An apparatus according to claim 7, further having recording means for recording an output of said switching means.

9. An image pickup apparatus comprising:
(A) image input means for inputting an image signal;
(B) memory means for storing the image signal output from said image input means;
(C) switching means for receiving an output of said image input means and an output of said memory means and operable to output the received output of the image pickup means or the received output of the memory means;
(D) detection means for detecting movement of an image from said image signal; and
(E) control means for controlling said switching means according to an output of said detection means so that the output of said image input means is selected to be output when the movement detected by said detection means is less than a predetermined value and the output of said memory means is selected to be output when the movement detected by said detection means exceeds said predetermined value.

10. An apparatus according to claim 9, wherein said detection means outputs a vibration vector signal representative of an amount of vibration of the image and direction of the vibration.

11. An apparatus according to claim 10, wherein said detection means is an external sensor unit which detects at least one of angular acceleration, angular velocity and angular displacement.

12. An apparatus according to claim 10, wherein said detection means is a movement detection circuit which detects change of the image by performing digital signal processing on the image signal in order to detect vibration.

13. An apparatus according to claim 9, further comprising recording means for recording one of the output of said image input means and the output of said memory means, which is selected by said switching means on a recording medium.

14. An apparatus according to claim 9, further comprising monitor means for displaying one of the output of said image input means and the output of said memory means, which is output by said switching means.

15. An image pickup apparatus comprising:
(A) image pickup means for photoelectrically converting an object image and generating an image pickup signal;
(B) memory means for storing the image pickup signal generated from the image pickup means;
(C) vibration detecting means for detecting a vibration of the image pickup apparatus; and
(D) control means responsive to detection of vibration by said vibration detecting means for controlling said memory means so as to perform at least a storing operation of said memory means only during the detection of vibration of less than a predetermined value.

16. An image pickup apparatus comprising:
(A) image pickup means for photoelectrically converting an object image and generating an image pickup signal;
(B) memory means for storing the image pickup signal generated from the image pickup means;
(C) vibration detecting means for detecting a vibration of the image pickup apparatus;
(D) switching means for receiving an output of said image input means and an output of said memory means and operable to output the received output of the image pickup means or the received output of the memory means; and
(E) control means for operating said switching means to output the received output of the memory means in response to said vibration detecting means detecting a vibration of the image pickup apparatus which is equal to or greater than a predetermined vibration value.

17. An apparatus according to claim 16, wherein said control means further operates said switching means to output the received output of the image input means in response to said vibration detecting means detecting a vibration of the image pickup apparatus which is less than said predetermined vibration value.

18. An apparatus according to claim 17, wherein said control means further causes said memory means to store the output of said image input means in response to said vibration detecting means detecting a vibration of the image pickup apparatus which is less than said predetermined vibration value.

* * * * *